(12) United States Patent
de Oliveira et al.

(10) Patent No.: US 8,007,550 B2
(45) Date of Patent: Aug. 30, 2011

(54) ARTIFICIAL FIRELOG USING NON-PETROLEUM WAXES

(75) Inventors: Willer de Oliveira, Stockton, CA (US); Gary W. Leach, Escalon, CA (US); Alan Zachary, Oakdale, CA (US)

(73) Assignee: Duraflame, Inc., Stockton, CA (US)

( * ) Notice: Subject to any disclaimer, the term of this patent is extended or adjusted under 35 U.S.C. 154(b) by 643 days.

(21) Appl. No.: 12/004,135

(22) Filed: Dec. 18, 2007

(65) Prior Publication Data

US 2008/0196301 A1    Aug. 21, 2008

Related U.S. Application Data

(60) Provisional application No. 60/876,032, filed on Dec. 19, 2006.

(51) Int. Cl.
*C10L 11/00* (2006.01)

(52) U.S. Cl. ............... 44/535; 44/544; 44/564; 44/565; 44/577; 44/579

(58) Field of Classification Search .................. 44/535, 44/544, 564, 565, 579, 577
See application file for complete search history.

(56) References Cited

U.S. PATENT DOCUMENTS

| | | | | |
|---|---|---|---|---|
| 1,863,517 A | * | 6/1932 | White | 44/579 |
| 1,961,411 A | * | 6/1934 | White et al. | 44/579 |
| 2,638,411 A | * | 5/1953 | Thompson et al. | 44/275 |
| 3,297,419 A | | 1/1967 | Eyre, Jr. | 44/6 |
| 3,431,093 A | | 3/1969 | Kreinik | 44/6 |
| 3,843,336 A | | 10/1974 | Messman | 44/25 |
| 4,040,796 A | | 8/1977 | Vincent et al. | 44/14 |
| 4,326,854 A | | 4/1982 | Tanner | 44/10 B |
| 4,333,738 A | | 6/1982 | Schrader | 44/15 B |
| 5,858,032 A | * | 1/1999 | Hardy et al. | 44/522 |
| 6,017,373 A | | 1/2000 | Frisch | 44/535 |

(Continued)

FOREIGN PATENT DOCUMENTS

CA    1113246    12/1981

(Continued)

OTHER PUBLICATIONS

U.S. Patent Application Publication No. 2005/0016062 A1, Bonnell-Rickard et al., Jan. 27, 2005.

(Continued)

*Primary Examiner* — Cephia D Toomer
(74) *Attorney, Agent, or Firm* — Koppel, Patrick, Heybl & Philpott; Michael J. Ram

(57) ABSTRACT

An artificial firelog of the invention includes as constituents (a) a combustible cellulosic material and (b) a combustible non-petroleum wax, wherein the relative proportions of the constituents are, by weight, from about 30% to about 70% of (a) and from about 30% to about 70% of (b) for 100 parts of (a) and (b). In one form of the invention, the combustible non-petroleum wax constituent may include one or more combustible materials derived from plant oils, vegetable oils, animal oils, fats, rosin, pitch, waxy materials and combinations thereof. In another form of the invention, the combustible non-petroleum wax constituent may include a formulated blend of individual non-petroleum wax components. In yet another form of the invention a combustible binding agent can be added to the blend of materials resulting in reduction of the portion of the more costly combustible wax component. A firelog according to the invention can provide a number of benefits, including lower cost, better lighting and flaming performance, and more environmentally sustainable in comparison to firelogs using petroleum waxes.

15 Claims, 2 Drawing Sheets

U.S. PATENT DOCUMENTS 6,136,054 A    10/2000    Tutupalli et al. ................ 44/535

FOREIGN PATENT DOCUMENTS

WO        WO 9614372   A    5/1996
WO    WO 2004072211   A2    8/2004

OTHER PUBLICATIONS

PCT Notification of the International Search Report and the Written Opinion of the International Searching Authority, Dated Apr. 9, 2008; for International Application No. PCT/US2007/026061.

* cited by examiner

US 8,007,550 B2

ARTIFICIAL FIRELOG USING NON-PETROLEUM WAXES

CROSS REFERENCE TO RELATED APPLICATIONS

This application claims the benefit of U.S. provisional application Ser. No. 60/876,032 filed Dec. 19, 2006.

BACKGROUND OF THE INVENTION

1. Field of the Invention

The present invention relates generally to artificial firelogs and particularly to artificial firelogs where the binder material includes non-petroleum derived waxes.

2. Description of the Related Art

Fireplaces have been used in homes over the years for providing heat as well as to provide a desired ambience. While wood and coal have been the primary fuels for burning in fireplaces, there is an increasing demand for manufactured or artificial fireplace logs. These logs are typically easier to purchase and store, provide better heating values (BTU/lb) than wood or coal, are easier to light, safer to use with virtually no maintenance during burning, and can be used to build fires of a known duration, generally from 2 hours to more than 4 hours.

Artificial firelogs are typically manufactured by combining a carrier material, usually particles of cellulosic origin, with a combustible binder/fuel. The cellulosic material may be sawdust, or a mixture of sawdust with other combustible materials of varying proportion. The binder/fuel typically consists of a suitable blend of waxes, typically a flammable wax such as paraffin or slack wax, flammable vegetable oils such as stearic and/or palmitic acid or other fatty acids or esters which can be used either alone or in combination with other combustible materials. Additives imparting desired combustion characteristics, appearance, and other attributes may be combined with the basic ingredients. Such additives may include chemicals designed to color or otherwise modify or retard the flame, add aroma or crackling sounds or otherwise change the burning characteristics to more closely mimic the burning of natural logs. Following thorough mixing of the ingredients, the resulting mixture is formed into suitable, log-like shapes by extrusion, molding or compression, in either a batch or continuous process.

U.S. Pat. Nos. 3,297,419; 6,017,373; 6,136,054; 5,868,804; 4,333,738; 4,326,854; 3,843,336; and 4,040,796, incorporated herein by reference in their entireties, provide examples of known artificial firelog compositions, configurations and methods of manufacture.

Firelog base waxes should have physical characteristics (e.g. melting point, hardness and/or malleability) that permit the material to be readily formed into firelogs having a pleasing appearance and/or feel to the touch, as well as having desirable olfactory properties.

Artificial firelogs are typically manufactured from blends of about 50% to about 60% (by weight) petroleum waxes and about 40% to 50% (by weight) cellulosic fibers. The petroleum wax constituent, which may include paraffin wax or slack wax by way of example, provides the principal fuel content for the firelog and contains about twice the BTU (British thermal unit) energy value per unit mass as the cellulosic fibers.

In recent years, there has been dramatic inflation in the cost of petroleum products, including refined products such as petroleum waxes. For example, petroleum wax costs increased 120% between January 2004 and July 2006, making it less economic for firelog manufacturers to use petroleum wax in their products. Furthermore, paraffin wax material is derived from non-renewable petroleum fossil fuel, and thus the byproducts of burning such fuel can contribute to the Greenhouse Effect.

The most common binder component of synthetic firelogs is a petroleum slack wax or a synthetic polymer of high molecular weight which provides good adhesion with cellulosic fibers. Saturated fatty acids such as palmitic or stearic acids can be used to raise the melting point of the wax blend or to solidify the binder. Unsaturated, oily fatty acids are generally excluded because they are liquid at room temperature and lack the binding characteristics required for firelogs. A liquid or soft wax binder material, such as that disclosed in U.S. Pat. No. 4,326,854, must be solidified with the fibers using chemical processes such as polymerization or neutralization in order to form a firelog, which can significantly increase the cost and complexity of production.

Therefore, there remains a need for renewable, non-petroleum based materials which can provide a clean burning base wax for forming firelogs in a practical, cost effective manner. If possible, such materials would preferably be biodegradable as well. Thus, an object of the present invention is to provide alternative raw materials for use in the manufacture of firelogs, materials that allow for the elimination or reduction in petroleum wax by substituting other, more cost effective, environmentally friendly and readily available materials that make up for the BTU energy content lost from the elimination or reduction of the higher BTU petroleum wax.

SUMMARY OF THE INVENTION

The present invention generally includes products, compositions and methods having a combustible non-petroleum wax binder/fuel constituent blended with a combustible cellulosic or fiber material constituent. The use of non-petroleum wax as a substitute for more expensive petroleum waxes, which are becoming more limited in supply, can provide a number of benefits, including a lower cost end product without an appreciable loss in heat energy content. Furthermore, since most non-petroleum waxes are derived from renewable, biologically based materials that are readily available, the present invention may also provide enhanced environmental sustainability characteristics for the product.

In one aspect, the invention can provide an artificial firelog having about 30% to about 70% by weight of combustible cellulosic material and about 30% to about 70% by weight of (b) combustible non-petroleum wax material, for a total of about 100 parts. In one form of the invention, the combustible non-petroleum wax constituent may include one or more combustible materials derived from plant oils, vegetable oils, animal fats, other waxy materials, and combinations thereof. In another form of the invention, the combustible non-petroleum wax constituent may include a formulated blend of individual non-petroleum wax components. In yet another form of the invention, the content of individual wax components in a blend can range from about 2.5% to about 60% by weight of the non-petroleum wax constituent. In a further form of the invention, the blend can contain two or more wax components. In a further form of the invention, an artificial firelog can further include (c) a combustible binding agent, where the relative proportions of the constituents are, by weight, from about 40% to about 60% of the combustible cellulosic material (a), from about 20% to about 40% of the combustible non-petroleum wax (b), and from about 2.5% to about 20% of the combustible binding agent (c), for about 100 total parts of (a), (b) and (c).

In another form of the invention, the non-petroleum wax constituent can contain from about 40% to about 70% of at least one hard, saturated fatty acid material and from about 30% to about 60% of at least one pitch material. In yet another form of the invention, a combustible binding agent may be added to the blend and the relative proportions of the constituents by weight can be: from about 40% to about 60% of the combustible cellulosic material; from about 20% to about 40% of combustible non-petroleum wax material; and from about 2.5% to about 20% of combustible binding agent, for about 100 total parts.

In another form of the invention, the non-petroleum wax constituents, by weight, can be from about 30% to about 60% of hard saturated fatty acid material, from about 2.5% to about 20% of hard fatty alcohol or rosin, and from about 20% to 50% of pitch material. In yet another form of the invention, a combustible binding agent may be added to the blend and the relative proportion of the constituents by weight can be: from about 40% to about 60% of combustible cellulosic material; from about 20% to about 40% of combustible non-petroleum wax; and from about 2.5% to about 20% of combustible binding agent, for about 100 total parts.

In another form of the invention, the non-petroleum wax constituent can be, by weight, from about 30% to about 60% of hard saturated fatty acid material, about 2.5% to about 10% of hard fatty alcohol or rosin material, from about 2.5% to about 10% of soft unsaturated fatty acid material, and from about 20% to about 50% of pitch material. In yet another form of the invention, a combustible binding agent may be added to the blend and the relative proportions of the constituents by weight can be: from about 40% to about 60% of combustible cellulosic material; from about 20% to about 40% of combustible non-petroleum wax; and from about 2.5% to about 20% of combustible binding agent, for 100 total parts.

In another form of the invention, the non-petroleum wax constituent, by weight, can include: from about 30% to about 60% of hard saturated fatty acid material; about 2.5% to about 10% of hard fatty alcohol or rosin material; from about 2.5% to about 10% of soft unsaturated fatty acid material; and from about 20% to about 50% of pitch material. In yet another form of the invention, a combustible binding agent may be added to the blend and the relative proportions of the constituents by weight can be: from about 40% to about 60% of the combustible cellulosic material; from about 20% to about 40% of combustible non-petroleum wax material; and from about 2.5% to about 20% of combustible binding agent, for about 100 total parts.

In another aspect, the invention can provide a binder composition for an artificial firelog which may consist of a formulated blend that includes at least one non-petroleum hard wax material and at least one non-petroleum soft wax material. In one form of the invention, the composition can solidify without chemical processing. In one form of the invention, the ratio of hard to soft non-petroleum wax material can be from about 1.0 to about 2.5. In another form of the invention, the composition may contain at least one hard wax material derived from a raw material such as a plant oil, a vegetable oil, an animal fat, and a tall oil, and at least one soft wax material derived from a raw material such as a plant oil, a vegetable oil, an animal fat, a glycerol, and a pitch.

In a further aspect, the invention may provide a method for producing a binder composition according to the invention. In one form of the invention, the method can include blending at least one hard wax material and at least one soft wax material, where the ratio of hard to soft non-petroleum wax materials can be from about 1.0 to about 2.5, and the composition can solidify without chemical processing.

DETAILED DESCRIPTION

Figure 1:
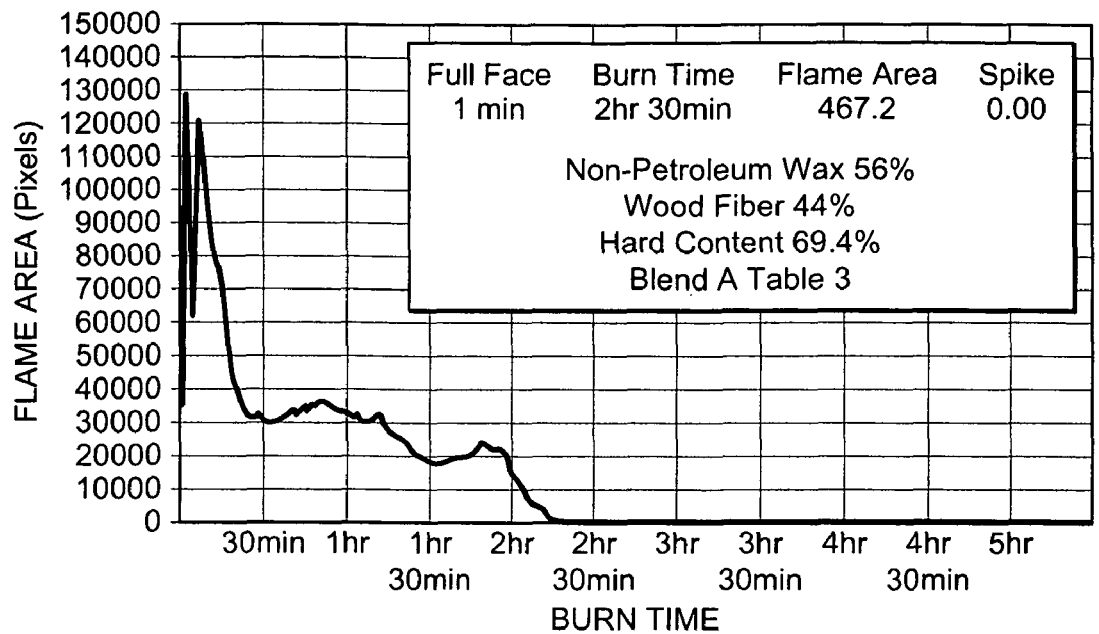
FIG. 1 is a line graph of one embodiment of the invention illustrating the burn time of a firelog having a hard wax content of about 69.4%.

This invention generally provides novel compositions which have the characteristics of, and can be useful as, substitutes for paraffin wax in the manufacture of firelogs, and products including the compositions. In particular, the present invention can provide compositions having wax substitutes derived from non-petroleum materials made from entirely renewable, sustainable materials which can be more cost-effective than the traditional use of petroleum derived waxes in firelogs. Optimal ratios between the chemical components of the composition, including without limitation saturated fatty acids, unsaturated fatty acids, resin acids (resins) and pitches, may be chosen to provide a hard/soft wax balance that can improve the burning characteristics of a firelog. A combustible binding agent may be also added to the blend, allowing the amounts of more costly wax components to be even further reduced.

In accordance with one preferred embodiment, an artificial firelog of the present invention may contain as constituents (a) combustible cellulosic or fiber material and (b) combustible non-petroleum wax, and (c) a combustible binding agent, wherein the relative proportions of the constituents are, by weight, from about 30% to about 70% of (a) and from about 30% to about 70% of (b) and from about 2.5% to about 20% of (c), for 100 parts of (a), (b) and (c).

Examples of combustible cellulosic or fiber material that may be used include, without limitation, wood particles, pulp, shavings or chips, sawdust, ground bark, shredded paper or cardboard, waxed cardboard, charcoal powder, sphagnum moss, and agricultural waste materials such as straw, bagasse, grass clippings, leaves, cotton linter, rice hulls, peanut, almond, walnut or other nut shells and hulls, distillers grain or other cereal grain by-products and coffee grounds, and blends of any two or more of the foregoing.

Examples of added combustible binding agents that may be used include, without limitation, any of the following individually or in a blend; polysaccharides such as vegetable starch from corn, potato, or wheat, polyols including molasses from cane or beet sugar, and glycerol generated from the transesterification of vegetable oils during the manufacture of biofuel.

The wax of a firelog material may be derived from a variety of sources, including without limitation those having a petroleum or non-petroleum base. A petroleum wax can contain one or more suitable wax or waxy materials, including without limitation combustible paraffins, microcrystalline and waxy crude oils, consisting of any one of the following, in whole or part of a blend, including; slack wax, scale wax, residual wax, olefins, and resins. A non-petroleum wax can similarly be characterized as combustible vegetable oils or animal fats, and/or wax materials derived therefrom, including without limitation in whole or part of a blend; plant and/or vegetable oils and/or animal fats, and/or other waxy materials including; triglycerides, sterols, terpenes, all C12 through C22 fatty acids (lauric, myristic, palmitic, stearic, oleic, linoleic, erucic and the like), fatty alcohols, glycerol, pitch, rosins and other oily substances and residues from soybean, canola, palm, palm kernel, beef tallow, lard, yellow grease, corn, safflower and tall oil.

Fatty acids can be obtained from fats and oils by a process in which the first step is referred to as splitting. Splitting is the hydrolysis of a fat or oil to form three molecules of fatty acids and one molecule of glycerin. Fatty acids containing only single carbon-to-carbon bonds are termed "saturated" and are the least reactive chemically, but of great importance in the wax industry. The main saturated fatty acids of practical interest for wax purposes are palmitic (C16) and stearic (C18). Fatty acids containing one or more carbon-to-carbon double bonds are termed "unsaturated." Some unsaturated fatty acids in food fats and oils of more industrial importance are oleic, and linoleic.

The physical characteristics of a fat or oil are mainly dependent upon the degree of unsaturation, and the length of the carbon chains. In general, fats that are liquid at room temperature tend to be more unsaturated than those that appear to be solid. The consistency (hardness) of the wax is generally dictated by the proper balance of saturated and unsaturated fatty acids. The saturated fatty acids, along with the resin acids, of the present invention can provide the hardness of the wax, and the unsaturated fatty acids and pitch can provide the softness characteristics of the binder.

Common fats and oils that can be used to make a non-petroleum wax blend for artificial firelogs include without limitation palm stearin, stearic acids, hydrogenated soy oil, hydrogenated tallow, distilled tall oil, and tall oil pitches. Palm stearin, and stearic acids are considered "hardeners" in firelog wax blends because their major chemical components are palmitic and stearic acids. These products are solid at room temperature with melting points of 138° F. and 145° F. respectively. The resin acids are also solid at room temperature. The combination of the saturated acids and the resin acids accounts for the hardener of the firelog wax. The soft and or sticky components of a non-petroleum wax blend are conferred by the inclusion of unsaturated components. The raw materials that are used for that purpose are typically oils rich in oleic and linoleic acids, as well as pitch which includes the highly viscous liquids made mostly of unsaturated fatty acids and uncharacterized low molecular weight reaction products from the distillation process. The proper blend ratio of saturated fatty acids, resin acids, unsaturated fatty acids and pitch can produce a non-petroleum wax mixture that is solid at room temperature with adequate consistency to be used as the firelog "wax." In some embodiments, a suitable ratio may be provided by an individual wax component without need for blending with other materials.

Experiments with combinations of various fatty and resin acids as raw (unpurified) materials have revealed that good, consistent wax blends for firelog applications generally have a chemical hard/soft component ratio for the raw materials of about 1.0, (i.e., around 50% by weight hard materials and 50% by weight soft materials). The hard component was calculated by adding the percentage of the saturated raw materials in the blend, such as palmitic or stearic acids, along with raw resin acids combined. The soft component was the obtained by combining the various ratios of oleics, linoleics, and pitch.

In light of this information, a further determination of the fatty acid profile and resin acid content of a specific raw material has been found to allow the property of a consistent wax blend to be predicted by a relatively simple calculation. Identifying the types and relative amounts of the major chemical components in the raw materials, and correlating that information with how particular ratios of raw materials can impact blend consistency can allow for the design of a consistent wax blend with different degrees of "hardness".

TABLE 2

Physical Properties of Common Non-Petroleum Wax Materials
Physical Properties

| Raw Material | Hard (%) | Soft (%) | RB (° F.) | Viscosity @ 200° F. (cP) | Heat Value (BTU/lb) |
|---|---|---|---|---|---|
| Stearic Acid | 100 | 0 | 145 | 5 | 17063 |
| Palm Stearin | 100 | 0 | 143 | | |
| Stearic acid Pitch | 85.0 | 15.0 | 138 | 9 | 17149 |
| Tall Oil Pitch | 12.8 | 87.2 | | 860 | 17013 |
| Distilled Tall Oil | 43.0 | 57.0 | | | 16806 |
| Tall Oil Pitch | 8.7 | 91.3 | | | 17070 |

Table 1 and Table 2 present data for the chemical composition and some physical properties of these materials, respectively. Table 1 illustrates the fatty acid, rosin and pitch profiles of a selection of the raw non-petroleum wax materials stearic acid, palm stearin, stearic acid pitch and distilled tall oil. The raw wax materials were obtained from standard commercial sources and the profiles were obtained using standard chemical analysis techniques such as: BTU per pound, ASTM D240; ring and ball (R&B), ASTM E28; viscosity (centipoise, cP), ASTM D1986; and hard and soft profiles, GC-FID (flame ionization detector chromatography). The chemical profiles in Table 1 demonstrate the multi-component nature of the raw materials typically used in the manufacture of firelogs according to the invention and, in particular, the varying relative amounts of the chemical components in such materials.

Table 2 presents data for some of the physical properties of common non-petroleum wax materials including their rela-

TABLE 1

Chemical Component Profiles of Non-Petroleum Wax Materials
Chemical Components

| Raw Material | Palmitic Acid | Stearic Acid | Saturated Acid | Oleic Acid | Linoleic Acid | Unsaturated Acid | Rosin | Pitch |
|---|---|---|---|---|---|---|---|---|
| Stearic Acid | 27.4 | 66.2 | 100.0 | 0.3 | 0.0 | 0.0 | 0.0 | 0.0 |
| Palm Stearin | 64.4 | 33.9 | 100.0 | 0.0 | 0.0 | 0.0 | 0.0 | 0.0 |
| Stearic acid Pitch | 9.3 | 70.0 | 85.0 | 0.2 | 0.8 | 2.8 | 0.0 | 12.3 |
| Distilled Tall Oil | 11.6 | 0.4 | 15.0 | 10.6 | 7.5 | 22.7 | 28.0 | 34.3 | tive hardness, viscosity and heat value. These data were obtained using standard analytical techniques.

Flame volume (intensity), especially the optimal flame characteristics and burning time of a firelog according to the present invention, may also be controlled by a careful selection of the wax binder components, that is, a wax blend with a targeted hard/soft component ratio. Table 3 shows several examples of blend formulations with calculated hard to soft component ratios. Hard waxes and wax materials are generally solid at ambient room temperature. Hard materials can also be classified as those materials that have a softening point of greater than 110° F. when using an ASTM E 28 Ring & Ball method for determination of softening points of polymers or waxes. Soft materials are those materials that are liquid, viscous and more pourable at room temperature. The weight percent of hard component was calculated by adding the combined weight percentage of the crystalline materials in the blend, such as saturated fatty acids and the resin acids. The soft component percentage was dictated by the amount of unsaturated fatty acids and pitch. The wax blend formulations shown in Table 3 have been found to provide variable burn characteristics, including without limitation flame intensity and burn time, depending upon the relative amounts of the chemical components. A high hard to soft ratio can, for example, produce a relatively high rate of burning and/or higher flames, whereas blends with about 50% or lower hard material can produce logs with lower flame volume and extended burn time.

Table 3 also shows some the physical properties of the blends (% by weight) such as the congealing point (CP), ring and ball (RB) softening point, cone penetration (Pen), and Brookfield viscosity (Visc) at 200° F. Cone penetration and congealing point were obtained using standard analytical techniques: cone penetration ASTM 1321; congealing point, ASTM D938. Overall, the harder the blend, the smaller its cone penetration value and the lower its viscosity. A harder blend can be made with a higher percent of saturated fatty acids, which have lower viscosity than the pitch components of softer blends. There was also an increase in softening point with increasing hardener content.

Figure 2:
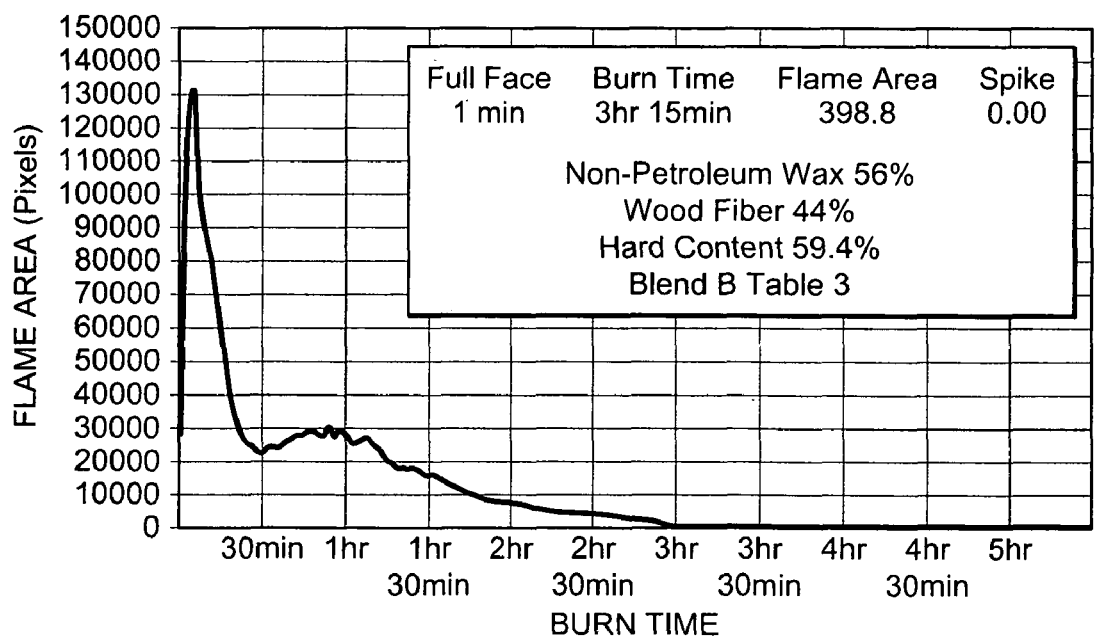
FIG. 2 is a line graph of one embodiment of the invention illustrating the burn time of a firelog having a hard wax content of about 59.4%.
Figure 3:
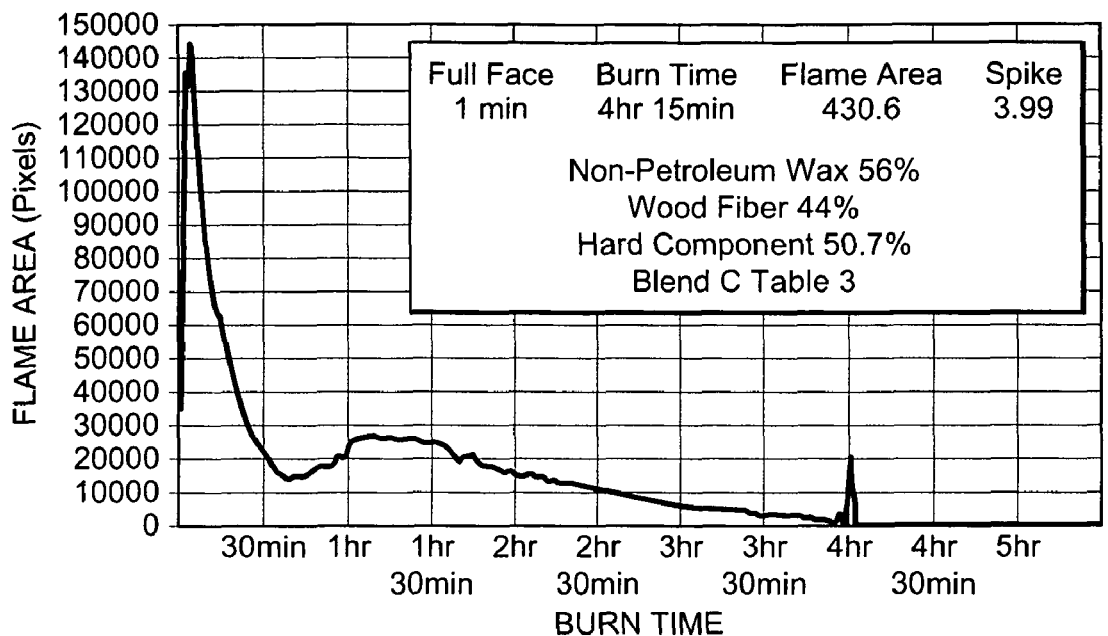
FIG. 3 is a line graph of one embodiment of the invention illustrating the burn time of a firelog having a hard wax content of about 50.7%.
Figure 4:
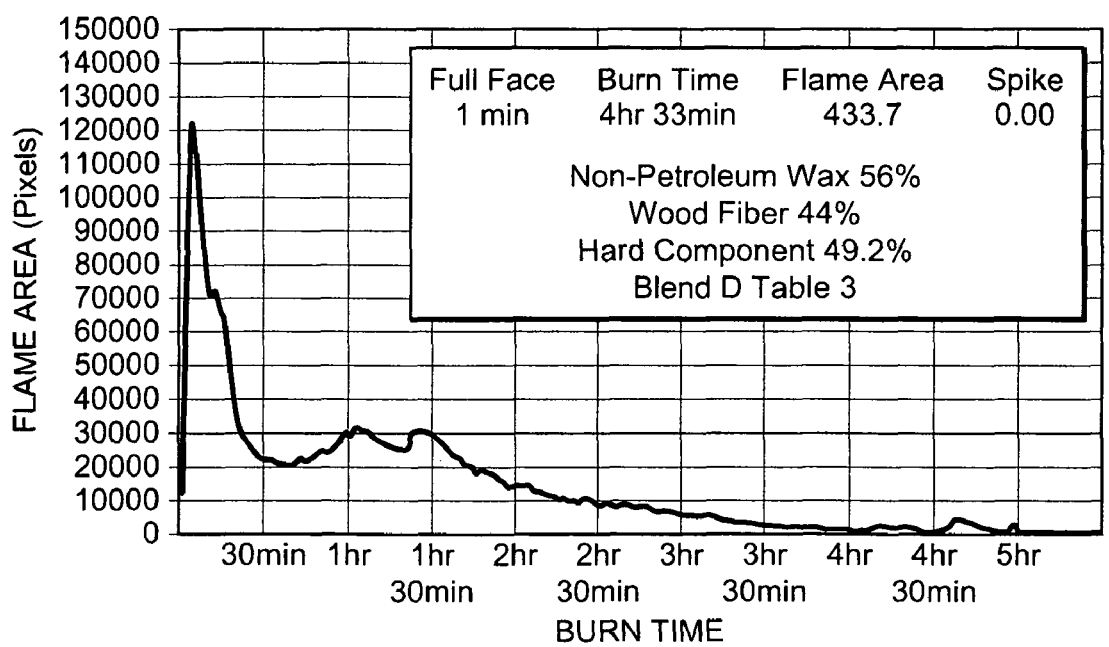
FIG. 4 is a line graph of one embodiment of the invention illustrating the burn time of a firelog having a hard wax content of about 49.2%.

FIGS. 1-4 illustrate the burn times for four different artificial firelogs according to the invention. The firelogs having identical proportions of: (a) combustible cellulosic materials (wood fiber); and (b) a combustible non-petroleum wax having a particular hardness derived from a specific ratio of chemical components. The relative proportions of these two constituents in the logs were, by weight, about 44% of (a) and about 56% of (b) for a total of about 100 parts of (a) and (b). However, the hardness of the binder wax composition in each of the firelogs varies as follows: FIG. 1, 69.4%; FIG. 2, 59.4%; FIG. 3, 50.7% and FIG. 4, 49.2%. These results clearly demonstrate that by adjusting or balancing the ratio of hard to soft components in wax blends allows control of the burn performance of the product firelog.

The data shown in FIGS. 1-4 therefore illustrate several examples of wax blend formulations that produce different burn characteristics and, as such, these formulations may provide targeted burn profiles. These data are, however, meant to be only exemplary and to give a general teaching and understanding of the invention.

These data shown in FIGS. 1-4 also demonstrates that formulations including soft material can be used to manufacture a firelog without requiring chemical hardening processes such as polymerization or neutralization.

TABLE 3

Blend compositions and physical properties

|  | Blend A | Blend B | Blend C | Blend D |
|---|---|---|---|---|
| Composition | | | | |
| Saturated acids, % | 65.9 | 52.0 | 42.1 | 40.6 |
| Unsaturated acids, % | 2.6 | 4.7 | 5.3 | 5.6 |
| Rosin, % | 3.5 | 7.4 | 8.6 | 8.6 |
| Pitch, % | 28.0 | 35.9 | 44.0 | 45.2 |
| Hard, % | 69.4 | 59.4 | 50.7 | 49.2 |
| Soft, % | 30.6 | 40.6 | 49.3 | 50.8 |
| Physical Property | | | | |
| Congealing Point, ° F. | 118 | 118 | 112 | 108 |
| Ring & Ball, ° F. | 135 | 128 | 123 | 121 |
| Cone Penetration, dmm | 2 | 13 | 22 | 21 |
| Viscosity, cP @ 200° F. | 10 | 13 | 24 | 30 |

The combustible non-petroleum wax constituent preferably includes a formulated blend of individual non-petroleum wax components, wherein an individual non-petroleum wax component preferably ranges from about 2.5% to about 70%, by weight, of the total non-petroleum wax constituent. The blends can solidify in the absence of chemical processing and petroleum derived components.

Non-limiting examples of preferred 2 component, 3 component, and 4 component non-petroleum wax blends may include:

A. 2 component blends (by weight):
  a. from about 40% to about 70% hard saturated fatty acid materials; and
  from about 30% to about 60% pitch.

B. 3 component blends (by weight):
  a. from about 30% to about 60% hard saturated fatty acid materials;
  b. from about 2.5% to about 20% hard fatty alcohol or rosin materials; and
  c. from about 20% to about 50% pitch.

C. 4 component blends (by weight);
  a. from about 30% to about 60% hard saturated fatty acid materials;
  b. from about 2.5% to about 20% hard fatty alcohol or rosin materials;
  c. from about 2.5% to about 10% Soft unsaturated fatty acid materials; and
  d. from about 20% to about 50% pitch.

Other additives may include chemicals designed to color or otherwise modify or retard the flame, add aroma or change the burning characteristics of the artificial firelog to more closely mimic the burning of natural logs, as well as various kinds of natural seeds and/or particulate industrial byproducts, such as metallurgical coke, for simulating the crackling sounds produced by a burning natural log. A broad range of known firelog cross sectional shapes may also be employed. For example, one or more longitudinally extending grooves may be provided to accelerate ignition. Still further, as is generally well known, the artificial firelogs may be enveloped in outer wrappers for protecting the firelog and facilitating its ignition. Artificial firelogs in accordance with the present invention may make use of the materials, configurations and other attributes referred to above; the foregoing list is not intended to limit the composition, configuration, or other attributes of flammable artificial firelogs described and claimed herein.

A firelog according to the invention can provide a number of benefits, including but not limited to: lower cost in comparison to firelogs using petroleum waxes; accelerated ignition, averaging about 2 to about 5 minutes to attain full face ignition as compared to about 5 to about 15 minutes with petroleum wax-based products; the production of more robust, fuller flames than is typically produced by a petroleum wax-based firelog; and lower particulate matter and carbon emissions during combustion than a petroleum wax-based firelog, with the carbon emitted being from a renewable, sustainable source which contributes no net increase of green house gases to the ambient atmosphere.

While illustrative embodiments of the invention have been described, numerous variations and alternate embodiments will occur to those skilled in the art. Such variations and alternate embodiments are contemplated, and can be made without departing from the spirit and scope of the invention as defined by the appended claims.

We claim:

1. An artificial firelog comprising as constituents (a) a combustible cellulosic material and (b) a combustible nonpetroleum wax, wherein the relative proportions of the constituents are, by weight, from about 30% to about 70% of (a) and from about 30% to about 70% of (b) for a total of about 100 parts of (a) and (b) and
wherein the non-petroleum wax constituent comprises, by weight, from about 40% to about 70% of at least one saturated fatty acid material solid at room temperature and from about 30% to about 60% of at least one constituent that is liquid at room temperature.

2. The artificial firelog of claim 1, wherein the combustible non-petroleum wax constituent comprises at least one combustible wax material derived from a raw material, and the raw material is selected from the group consisting of a plant oil, a vegetable oil, an animal fat, a rosin, a pitch and combinations thereof.

3. The artificial firelog of claim 1, wherein the combustible non-petroleum wax constituent comprises a formulated blend of two or more non-petroleum wax components.

4. The artificial firelog of claim 3, wherein an two or more non-petroleum wax component ranges from about 2.5% to about 60%, by weight, of the non-petroleum wax constituent.

5. An artificial firelog comprising as constituents (a) a combustible cellulosic material and (b) a combustible non-petroleum wax, wherein the relative proportions of the constituents are, by weight, from about 30% to about 70% of (a) and from about 30% to about 70% of (b) for a total of about 100 parts of (a) and (b), wherein the non-petroleum wax constituent comprises a blend of at least two individual non-petroleum wax components, and the non-petroleum wax constituent comprises, by weight, from about 40% to about 70% of at least one saturated fatty acid material solid at room temperature and from about 30% to about 60% of at least one pitch material.

6. An artificial firelog of claim 5, further comprising a combustible binding agent (c), wherein the relative proportions of the constituents are, by weight, from about 40% to about 60% of the combustible cellulosic material (a), from about 20% to about 40% of the combustible non-petroleum wax (b), and from about 2.5% to about 20% of the combustible binding agent (c) for about 100 parts of (a), (b) and (c).

7. The artificial firelog of claim 5 wherein the non-petroleum wax constituent comprises, by weight, from about 30% to about 60% of at least one saturated fatty acid material solid at room temperature, from about 2.5% to about 20% of at least one fatty alcohol or rosin solid at room temperature, and from about 20% to 50% of at least one pitch material.

8. The artificial firelog of claim 7, further comprising (c) a combustible binding agent, wherein the relative proportions of the constituents are, by weight, from about 40% to about 60% of the combustible cellulosic material (a), from about 20% to about 40% of the combustible non-petroleum wax (b), and from about 2.5% to about 20% of the combustible binding agent (c), for about 100 parts of (a), (b) and (c).

9. The artificial firelog of claim 5 wherein the nonpetroleum wax constituent comprises, by weight, from about 30% to about 60% of at least one saturated fatty acid material solid at room temperature, about 2.5% to about 10% of at least one fatty alcohol or rosin material solid at room temperature, from about 2.5% to about 10% of at least one unsaturated fatty acid material not solid at room temperature, and from about 20% to about 50% of at least one pitch material.

10. The artificial firelog of claim 9, further comprising a combustible binding agent (c), wherein the relative proportions of the constituents are, by weight, from about 40% to about 60% of the combustible cellulosic material (a), from about 20% to about 40% of the combustible non-petroleum wax (b), and from about 2.5% to about 20% of the combustible binding agent (c), for 100 parts of (a), (b) and (c).

11. A binder composition for an artificial firelog comprising a formulated blend, wherein the blend comprises at least one non-petroleum wax material solid at room temperature and at least one non-petroleum wax material flowable at room temperature comprising unsaturated components, wherein the ratio of wax material which is solid at room temperature to wax material which is flowable at room temperature is from about 1.0 to about 2.5.

12. The composition of claim 11 wherein the composition is solid at room temperature without use of chemical processing.

13. The composition of claim 11, wherein:
the at least one wax material solid at room temperature is derived from a raw material selected from the group consisting of a plant oil, a vegetable oil, an animal fat, and a tall oil; and
the at least one wax material flowable at room temperature is derived from a raw material selected from the group consisting of a plant oil, a vegetable oil, an animal fat, a glycerol, and a pitch.

14. A method for producing the binder composition of claim 11, the method comprising blending at least one non-petroleum wax material solid at room temperature and at least one non-petroleum wax material flowable at room temperature, wherein:
the ratio of the at least one-wax material solid at room temperature to the at least one wax material flowable at room temperature is from about 1.0 to about 2.5; and
the composition not requiring chemical processing to form a composition solid at room temperature.

15. The artificial firelog of claim 1, further comprising (c) a combustible binding agent, wherein the relative proportions of the constituents are, by weight, from about 40% to about 60% of the combustible cellulosic material (a), from about 20% to about 40% of the combustible non-petroleum wax (b), and from about 2.5% to about 20% of the combustible binding agent (c), for about 100 parts of (a), (b) and (c).

* * * * *

US 8,007,550 C1

(12) EX PARTE REEXAMINATION CERTIFICATE (10548th)

United States Patent
de Oliveira et al.

(10) Number: US 8,007,550 C1
(45) Certificate Issued: Mar. 23, 2015

(54) ARTIFICIAL FIRELOG USING NON-PETROLEUM WAXES

(75) Inventors: Willer de Oliveira, Stockton, CA (US); Gary W. Leach, Escalon, CA (US); Alan Zachary, Oakdale, CA (US)

(73) Assignee: Duraflame, Inc., Stockton, CA (US)

Reexamination Request:
No. 90/012,440, Aug. 17, 2012

Reexamination Certificate for:
Patent No.: 8,007,550
Issued: Aug. 30, 2011
Appl. No.: 12/004,135
Filed: Dec. 18, 2007

Related U.S. Application Data

(60) Provisional application No. 60/876,032, filed on Dec. 19, 2006.

(51) Int. Cl.
*C10L 11/00* (2006.01)
*C10L 7/00* (2006.01)
*C10L 5/36* (2006.01)
*C10L 5/44* (2006.01)

(52) U.S. Cl.
CPC . *C10L 7/00* (2013.01); *C10L 5/365* (2013.01); *C10L 5/44* (2013.01); *Y02E 50/30* (2013.01); *Y02E 50/10* (2013.01)
USPC .................. 44/535; 44/544; 44/564; 44/565; 44/577; 44/579

(58) Field of Classification Search
None
See application file for complete search history.

(56) References Cited

To view the complete listing of prior art documents cited during the proceeding for Reexamination Control Number 90/012,440, please refer to the USPTO's public Patent Application Information Retrieval (PAIR) system under the Display References tab.

*Primary Examiner* — Jerry D Johnson

(57) ABSTRACT

An artificial firelog of the invention includes as constituents (a) a combustible cellulosic material and (b) a combustible non-petroleum wax, wherein the relative proportions of the constituents are, by weight, from about 30% to about 70% of (a) and from about 30% to about 70% of (b) for 100 parts of (a) and (b). In one form of the invention, the combustible non-petroleum wax constituent may include one or more combustible materials derived from plant oils, vegetable oils, animal oils, fats, rosin, pitch, waxy materials and combinations thereof. In another form of the invention, the combustible non-petroleum wax constituent may include a formulated blend of individual non-petroleum wax components. In yet another form of the invention a combustible binding agent can be added to the blend of materials resulting in reduction of the portion of the more costly combustible wax component. A firelog according to the invention can provide a number of benefits, including lower cost, better lighting and flaming performance, and more environmentally sustainable in comparison to firelogs using petroleum waxes.

At the time of issuance and publication of this certificate, the patent remains subject to pending reissue application number 14/015,915 filed Aug. 30, 2013. The claim content of the patent may be subsequently revised if a reissue patent is issued from the reissue application.

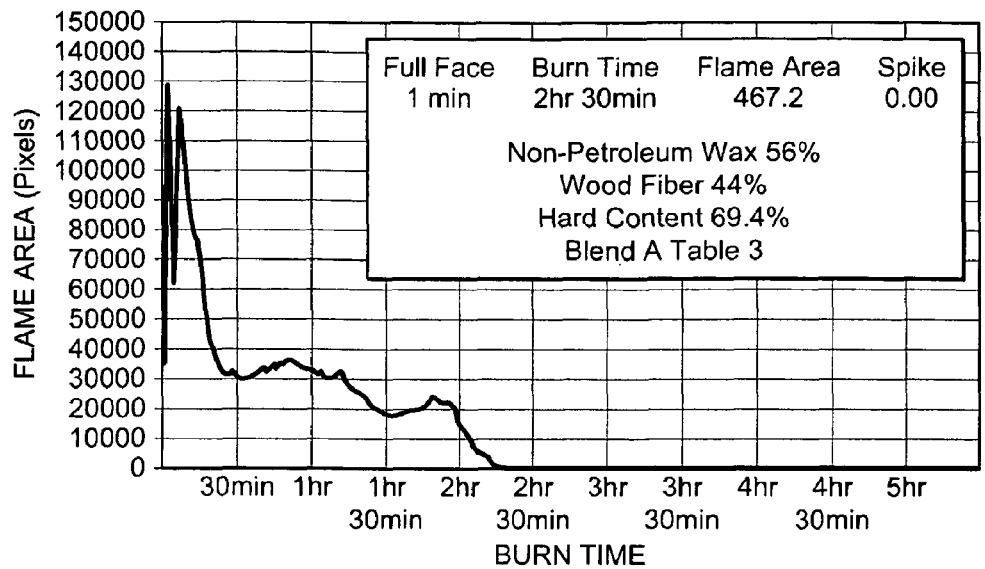

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-15 are cancelled.

\* \* \* \* \*